United States Patent
Liang et al.

(10) Patent No.: US 9,135,172 B2
(45) Date of Patent: Sep. 15, 2015

(54) CACHE DATA MIGRATION IN A MULTICORE PROCESSING SYSTEM

(75) Inventors: Jian Liang, San Diego, CA (US); Jian Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 13/565,140

(22) Filed: Aug. 2, 2012

(65) Prior Publication Data

US 2014/0040553 A1   Feb. 6, 2014

(51) Int. Cl.
*G06F 12/00* (2006.01)
*G06F 12/08* (2006.01)

(52) U.S. Cl.
CPC ........ *G06F 12/0806* (2013.01); *G06F 12/0893* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 7,103,728 B2 | 9/2006 | Sharma et al. | |
| 7,143,245 B2 | 11/2006 | Tierney et al. | |
| 7,469,321 B2 | 12/2008 | Heller, Jr. | |
| 2010/0281222 A1 | 11/2010 | Liu et al. | |
| 2011/0066830 A1 | 3/2011 | Wolfe et al. | |

FOREIGN PATENT DOCUMENTS

| | | |
|---|---|---|
| EP | 0390538 A2 | 10/1990 |
| EP | 0397994 A2 | 11/1990 |
| WO | 0248889 A1 | 6/2002 |
| WO | 2010142432 A2 | 12/2010 |

OTHER PUBLICATIONS

Second Written Opinion from International Application No. PCT/US2013/048943, dated Aug. 8, 2014, 2 pp.
International Search Report and Written Opinion—PCT/US2013/048943—ISA/EPO, Jan. 9, 2014, 16 pp.
Partial International Search Report—PCT/US2013/048943—ISA/EPO, Oct. 22, 2013, 6 pp.

*Primary Examiner* — Midys Rojas
(74) *Attorney, Agent, or Firm* — Shumaker & Sieffert, P.A.

(57) ABSTRACT

A method of transferring data between two caches comprises sending a first message from a first processor to a second processor indicating that data is available for transfer from a first cache associated with the first processor, requesting, from the second processor, a data transfer of the data from the first cache to a second cache associated with the second processor, transferring the data from the first cache to the second cache in response to the request, and sending a second message from the second processor to the first processor indicating that the data transfer is complete.

30 Claims, 6 Drawing Sheets

CACHE DATA MIGRATION IN A MULTICORE PROCESSING SYSTEM

TECHNICAL FIELD

This disclosure relates to techniques for cache data migration, and more specifically to techniques and systems for transferring data between caches in a multicore processing system.

BACKGROUND

Heterogeneous multicore systems are processing systems that contain two or more types of processors. For example, a heterogeneous multicore system may include two or more of a central processing unit (CPU), graphics processing unit (GPU), digital signal processor (DSP), or other types of processing cores. In such systems, each processor may have its own local cache for storing frequently used data. In addition, a given processor may have multiple parallel cores.

In some instances, it is desirable to share data used by one type of processor in its local cache with another type of processor. In such instances, a data handoff technique may be used to transfer the data. One such data handoff technique involves flushing the data from a local cache of one processor and transferring the data to a system memory. A second processor may then copy the data from system memory into its local cache.

As another example, some techniques may utilize a cache coherency mechanism to handle data transfers between processing cores. A cache coherency mechanism keeps track of what processing core(s) are allowed to access certain data stored in a central system memory and to copy that data to their local cache. This mechanism ensures the integrity of data that is frequently used by many different processing cores. However, such systems are often very complex and may involve undesirable latency when accessing data.

Both techniques described above require substantial performance and power resources. This leads to significant drawbacks for devices with limited power and performance potential (e.g., wireless devices).

SUMMARY

In general, this disclosure describes techniques for cache data migration, and more specifically to techniques and systems for transferring data between caches in a multicore processing system. In particular, this disclosure proposes the use of handshaking signals between two or more heterogeneous processors so that a cache associated with a processor of a first type may be used as tightly coupled memory for a processor of a second type.

In one example of the disclosure, a method of transferring data between two caches comprises initiating, with a first message, a transfer of data between a first cache associated with a first processor and a second cache associated with a second processor. In one example the first message is sent from a first processor to a second processor indicating that data is available for transfer from a first cache associated with the first processor. The method may further include requesting, from the second processor, a data transfer of the data from the first cache to a second cache associated with the second processor, transferring the data from the first cache to the second cache in response to the request, and sending a second message from the second processor to the first processor indicating that the data transfer is complete.

In another example of the disclosure, an apparatus configured to transfer data between two caches comprising, a first processor, a first cache associated with the first processor, a second processor, and a second cache associated with the second processor, wherein the first cache includes at least one partition that is configured to be a tightly coupled memory for the second cache, and wherein the first processor and the second processor are configured to transfer data directly from the first cache to the second cache through the use of handshaking signals.

In another example of the disclosure, an apparatus configured to transfer data between two caches comprises means for sending a first message from a first processor to a second processor indicating that data is available for transfer from a first cache associated with the first processor, means for requesting, from the second processor, a data transfer of the data from the first cache to a second cache associated with the second processor, means for transferring the data from the first cache to the second cache in response to the request, and means for sending a second message from the second processor to the first processor indicating that the data transfer is complete.

In another example of the disclosure a computer-readable storage medium storing instructions that, when executed, cause one or more processors to send a first message from a first processor to a second processor indicating that data is available for transfer from a first cache associated with the first processor, request, from the second processor, a data transfer of the data from the first cache to a second cache associated with the second processor, transfer the data from the first cache to the second cache in response to the request, and send a second message from the second processor to the first processor indicating that the data transfer is complete The techniques of this disclosure are also described in terms of an apparatus and a computer-readable storage medium storing instructions for causing a processor to perform the techniques. The details of one or more examples are set forth in the accompanying drawings and the description below. Other features, objects, and advantages will be apparent from the description and drawings, and from the claims.

DETAILED DESCRIPTION

In general, this disclosure describes techniques for cache data migration, and more specifically to techniques and systems for transferring data between caches in a multicore processing system. In particular, this disclosure proposes the use of handshaking signals between two or heterogeneous processors so that a cache associated with a processor of a first type may be used as tightly coupled memory for a processor of a second type.

Figure 1:
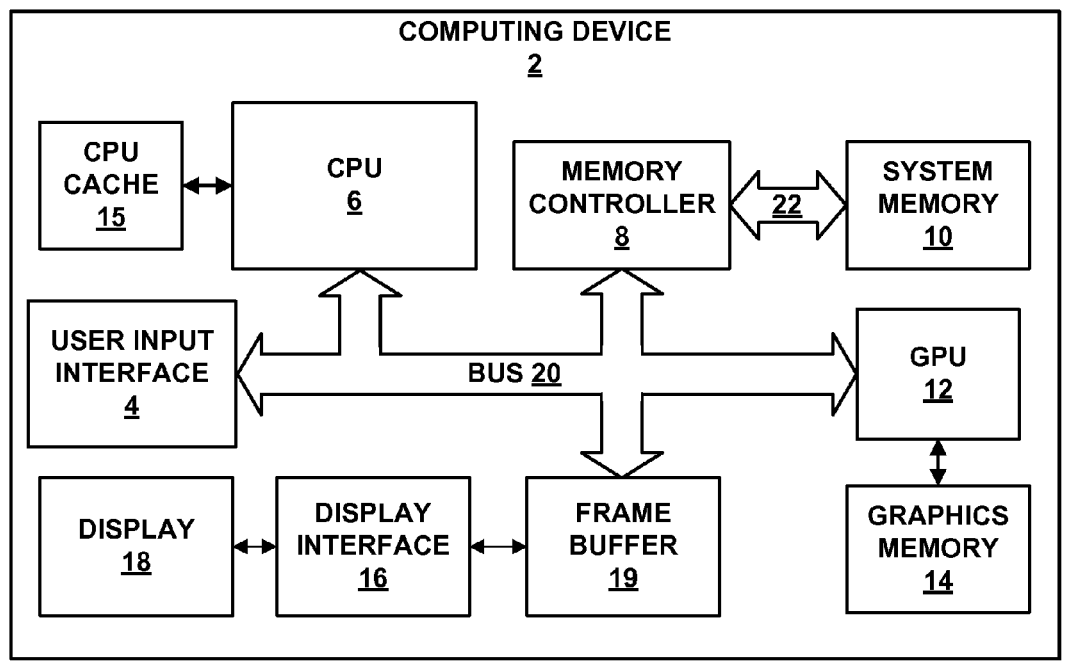
FIG. 1 is a block diagram showing an example computing device configured to use the techniques of this disclosure.

FIG. 1 is a block diagram illustrating an example computing device 2 that may be used to implement the techniques of this disclosure for cache data migration in a multicore system. Computing device 2 may comprise, for example, a personal computer, a desktop computer, a laptop computer, a computer workstation, a tablet computer, a video game platform or console, a mobile telephone such as, e.g., a cellular or satellite telephone, a landline telephone, an Internet telephone, a so-called smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

In particular, computing device 2 may be a multi-processor system having two or more processing cores, where at least two processor cores have separate, dedicated memory caches. In some example, computing device 2 may be a heterogeneous multicore system have two or processing cores of different types. For example, computing device 2 may include two or more of central processing unit (CPU) cores, graphics processing unit (GPU) cores, digital signal processing (DSP) cores, or any other type of processing core. Typically, processing cores of different types have separate, dedicate memory caches for each processor type that are not directly accessible to processing cores of different types. In addition, a given processor, such as CPU 6 or GPU 12, may itself include multiple processor cores, e.g., on the same integrated circuit chip.

In the example of FIG. 1, computing device 2 may include a user input interface 4, a central processing unit (CPU) 6, a memory controller 8, a system memory 10, a graphics processing unit (GPU) 12, a graphics memory 14, a CPU cache 15, a display interface 16, a display 18 and buses 20 and 22. Graphics memory 14 may be "on-chip" with GPU 12 and CPU cache 15 may be "on-chip" with CPU 15. Graphics memory 14 and CPU 15 are examples of memories that may include one more partitions that are tightly-coupled memories for their associated processing cores. A tightly-coupled memory (TCM) is low-latency memory that provides a processing core with fast access to data without the unpredictably of other types of memory cache. As opposed to other partitions in a cache, a TCM partition is part of the physical memory map of a system and no writes to external memory (e.g., system memory 10) having the same physical memory address need to be stored. A TCM may be configured to store either data or instructions, and may store data and/or instructions in parallel with other data caches and instructions caches not designated as TCM. The size of TCM partitions is flexible, and may be, for example, specified from 4 kB to 256 kB. However, any size TCM may be utilized.

User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application, a telecommunication program, a storage utility program, or another program. Additionally, CPU 6 may execute a GPU driver for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through a GPU driver) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In other instances, GPU 12 and CPU 6 may be integrated together with other components in a system on chip (SoC) package. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also contain programmable shader units and/or fixed function logic circuitry.

GPU 12 may be directly coupled to graphics memory 14. Thus, GPU 12 may read data from and write data to graphics memory 14 without using bus 20. Likewise, CPU 6 may read data from and write data to CPU cache 15 without using bus 20. In other words, GPU 12 and CPU 6 may process data locally using a local storage, instead of off-chip memory. This allows GPU 12 and CPU 6 to operate in a more efficient manner by eliminating the need to read and write data via system bus 20, which may experience heavy bus traffic. In some instances, however, GPU 12 and CPU 6 may also utilize system memory 10 via system bus 20. Graphics memory 14 and CPU cache 15 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), or a Flash memory.

CPU 6 and/or GPU 12 may store rendered image data in a frame buffer 19. Frame buffer 19 may be an independent memory or may be is allocated within system memory 10. Display interface 16 may retrieve the data from frame buffer 19 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

In some instances, it is desirable to share data used by one type of processor (e.g., CPU 6) in its local cache (e.g., CPU cache 15) with another type of processor (GPU 12). In such instances, a data handoff technique may be used to transfer the data. One such data handoff technique involves flushing the data from a local cache of one processor and transferring the data to a system memory. A second processor may then copy the data from system memory into its local cache. When the data is flushed from the local cache, the locations in the local cache storing the data may be overwritten. The first processor would need to access system memory again to regain use of the data from the flushed cache.

As another example, some techniques may utilize a cache coherency mechanism to handle data transfers between processing cores. A cache coherency mechanism, by a memory controller (e.g., memory controller 8), keeps track of what processing core(s) are allowed to access certain data stored in a central system memory and to copy that data to their local cache. This mechanism ensures the integrity of data that is frequently used by many different processing cores. However, such systems are often very complex and may involve undesirable latency when accessing data. Both techniques described above require substantial performance and power resources. This leads to significant drawbacks for devices with limited power and performance potential (e.g., wireless devices).

In view of these drawbacks, the present disclosure presents techniques for transferring data between the local caches of two different processors. In particular, this disclosure describes techniques that allow for the transfer of data from cache to cache without use of the system memory or a cache coherency mechanism. The techniques of this disclosure may be particularly useful in applications where only a few types of processing cores are used. In particular, in systems where parallel processors interact using the same data. One example of such an application is data handoff between a CPU and a GPU in general purpose GPU (GPGPU) applications. Another typical usage case is block transfer (BLIT) operations which are often used in graphics applications (e.g., for user interfaces). When rendering a user interface, a CPU may transfer the bitmaps to a GPU. The typical size of bitmaps is particularly applicable to the size of TCM cache partitions. As such, by utilizing the techniques of this disclosure for CPU to GPU BLIT operations, fast responding times and power saving can be achieved.

Figure 2:
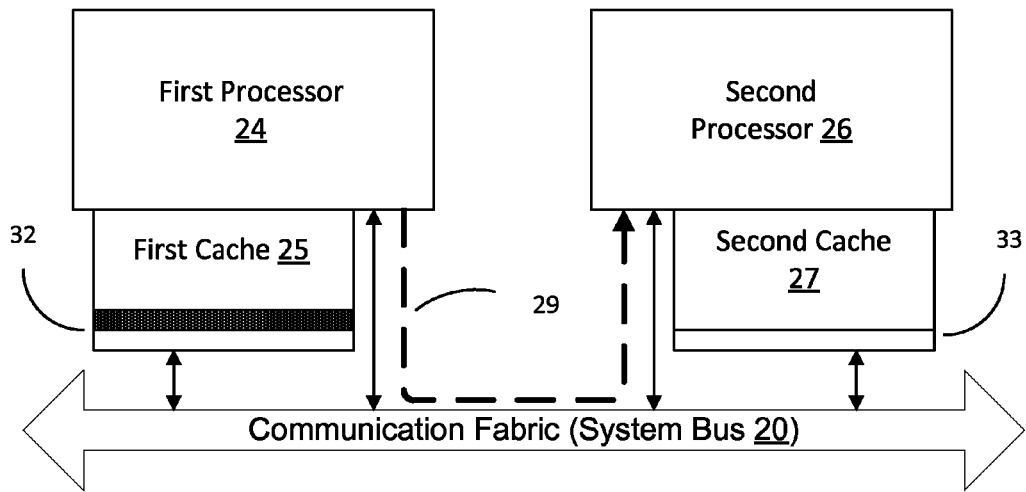
FIG. 2 is a block diagram showing a first step in an example system according to one example of the disclosure.

FIG. 2 is a block diagram showing an example system according to one example of the disclosure. According to this example, data is transferred directly from a local cache (e.g., a cache of a first processor) to a remote cache (e.g., a cache of a second processor) across system bus 20, without using a system memory. First processor 24 may be associated with a first cache 25 that is accessible to first processor 24, e.g., via first internal bus, without going through system bus 20 to a system memory. Likewise, second processor 26 may be associated with a second cache 27 that is accessible to second processor 26, e.g., via second internal bus, without going through system bus 20 to a system memory.

First cache 25 may include a partition 32 that is configured to be accessible by a remote processor (e.g., second processor 26) as tightly coupled memory (TCM). In some examples, partition 32 may be pre-mapped and assigned as TCM for second processor 26. In other examples, partition 32 (or other partitions of first cache 25) may be mapped as TCM for second processor 26 on an "as-needed" basis. That is, mapping a first cache of a first processor to a second cache of a second processor is performed in response to a request for data transfer. Mapping of partition(s) may be done by a memory controller within a cache or by another hardware unit of a computing device. A TCM is a memory connected to a processor so as to provide for dedicated access. TCMs generally perform more quickly than regular cache and are more suitable for real-time applications.

Data transfers between the first cache and the second cache may be initiated with a first message. In one example, first processor 24 may be configured to signal a first message 29 to second processor 26 to indicate that data in first cache 25 is available for transfer. The data available for transfer is represented as the shaded area in partition 32 of first cache 25. The first message may be triggered by an application executing on the first processor in situations where the first processor no longer needs the data in first cache 25 and further processing of the data is to be performed by second processor 26. First message 29 may be signaled to second processor 26 through any communication fabric available in the computing device. As one example, first message 29 may be sent through system bus 20, as shown in FIG. 1. In other examples, signaling between processors may be over other buses or communication lines configured for such communication, or may affected through a hardware interrupt, through direct memory access (DMA), or through independent control logic between two or more caches without intervention of any processors.

In another example, data transfer may also be initiated by a request for data sent from the second processor to the first processor. That is the first message initiating the data transfer comes from the second processor as a request, rather than from the first processor as an indication that data is available for transfer. In this example, first processor 24 may wait until any processing by first process 24 on the data in first cache 25 is completed before sending the data to second cache 27. First message 29 may be signaled in response to a request for data from second processor 26 or in response to an instruction (e.g., a computer program) being executed on first processor 24.

Figure 3:
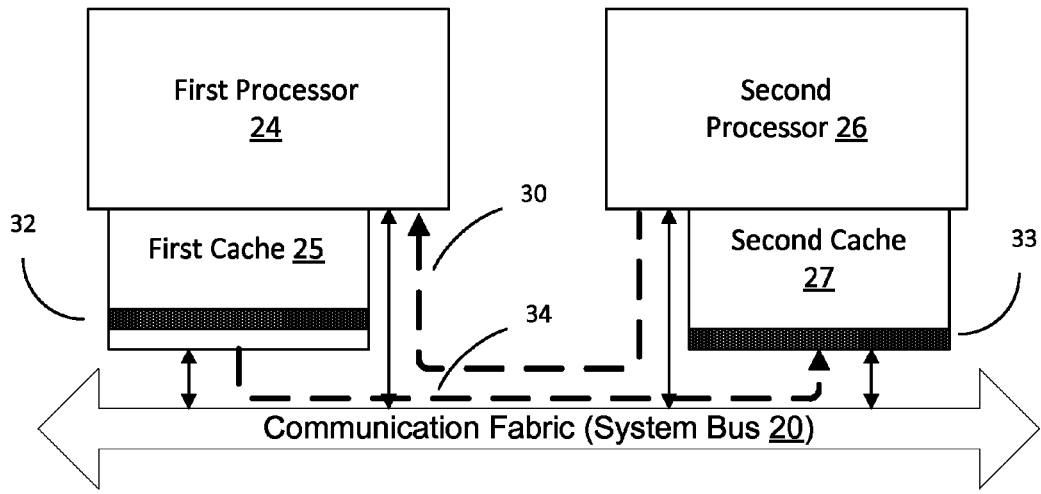
FIG. 3 is a block diagram illustrating the next step in an example cache-to-cache data transfer according to the disclosure.

FIG. 3 is a block diagram illustrating the next step in an example cache-to-cache data transfer according to the disclosure. Second processor 26 may be configured to signal a data transfer request 30 to first processor 24. Again, the data transfer request 30 may be signaled through any communication fabric available or through a hardware interrupt. In response to data transfer request 30, first processor 24 transfers the data (34) in partition 32 of first cache 25 to partition 33 of second cache 27. The data transfer 34 may be made over any communication fabric of the computing device. For example, data transfer 34 may be made over system bus 20 of FIG. 1. As discussed above, partition 25 and 27 may be pre-mapped to each other, or may be dynamically mapped in response to the data transfer request. A dynamic remapping of TCM partitions may allow for re-use of memory blocks for other purposes and more provide for more efficient and flexible memory usage. In addition, partition 32 may be assigned as TCM for second processor 26.

Figure 4:
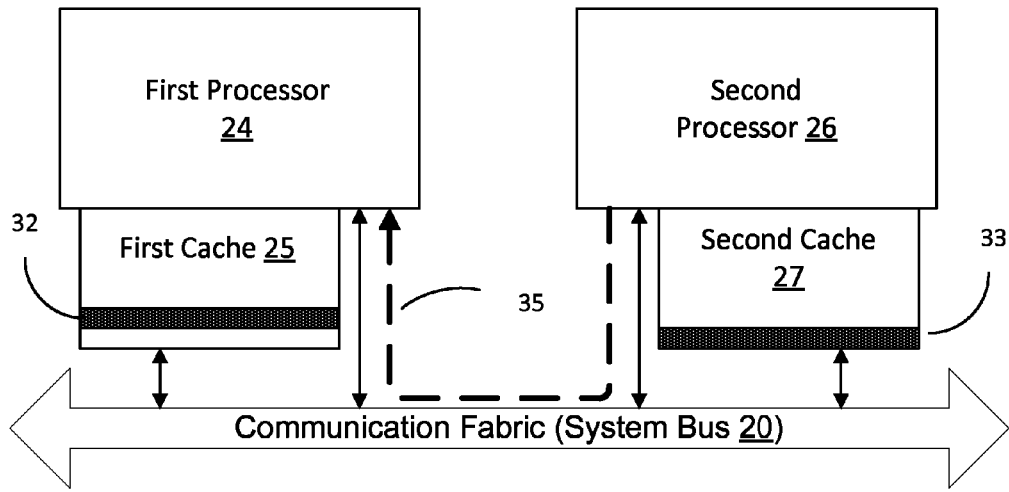
FIG. 4 is a block diagram illustrating the next step in an example cache-to-cache data transfer according to the disclosure.
Figure 5:
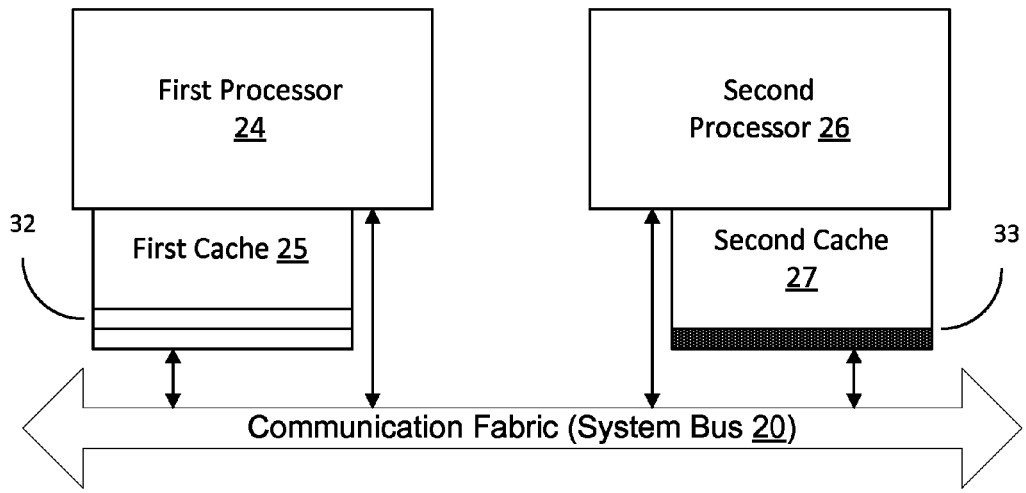
FIG. 5 is a block diagram illustrating the next step in an example cache-to-cache data transfer according to the disclosure.

FIG. 4 is a block diagram illustrating the next step in an example cache-to-cache data transfer according to the disclosure. After data transfer 34 (see FIG. 3) is complete, second processor 26 may be configured to signal a second message 35 that indicates transfer of the data into partition 33 of second cache 27 is complete and successful. Again, second message 35 may be signaled through any communication fabric available or through a hardware interrupt. FIG. 5 is a block diagram illustrating the next step in an example cache-to-cache data transfer according to the disclosure. In response to receiving second message 35, first processor 24 may be configured to clear the data from partition 32 of first cache 25, thus freeing that cache for additional data writes. First message 29 indicating that data is available for transfer, data transfer request 30, and second message 35 indicating that the data transfer is complete, together form handshaking signal that facilitate the direct transfer of data from a cache associated with a first processor to a cache associated with a second processor. As described above, any handshaking signaling between processors may be over other buses or communication lines configured for such communication (e.g., buses other than system bus 20), or may affected through a hardware interrupt, through direct memory access (DMA), or through independent control logic between two or more caches without intervention of any processors.

First processor 24 and second processor 26 may be any type of processors where their associated caches (e.g., first cache 25 and second cache 27) are not directly accessible by one another. As such, in some examples, first processor 24 and second processor 26 may be of the same type (e.g., two different CPU cores). In another example of the disclosure, first processor 24 and second processor 26 are of different types (e.g., CPU, GPU, DSP, etc.). In particular, first processor 24 and second processor 26 may be part of a heterogeneous multicore system.

Figure 6:
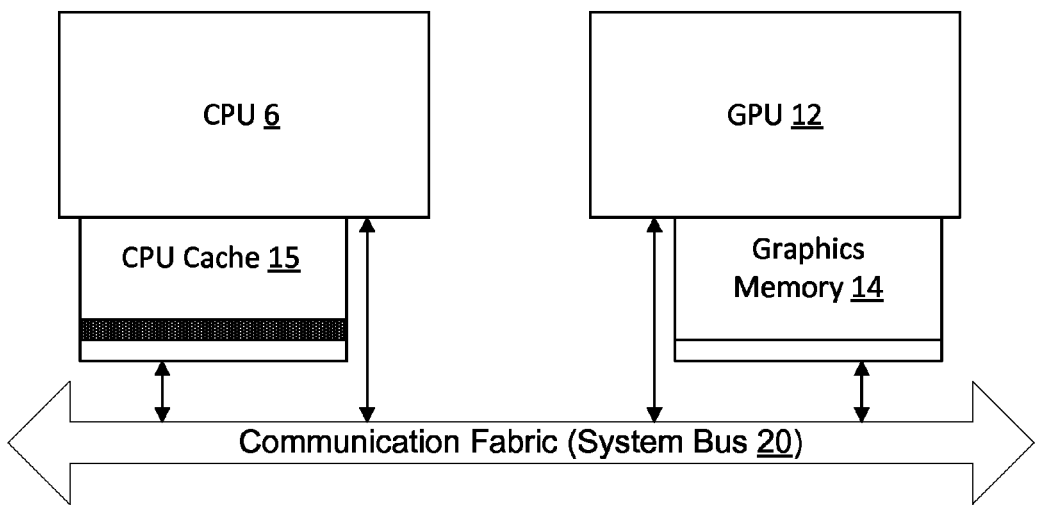
FIG. 6 shows one example of a heterogeneous multicore system according to one example of the disclosure.

FIG. 6 shows one example of a heterogeneous multicore system according to one example of the disclosure. In this example, the first processor is CPU 6 and the second processor is GPU 12. As such, CPU 6 and GPU 12 may be configured to transfer data between their associated caches (e.g., CPU cache 15 and graphics memory 14) according to the techniques depicted in FIGS. 2-5. Note that the direction of the data transfer need not always be from CPU 6 to GPU 12, but may also be performed in the reverse. That is, data may be transferred from the second processor (e.g., GPU 12) to the first processor (e.g., CPU 6) in the same manner.

Figure 7:
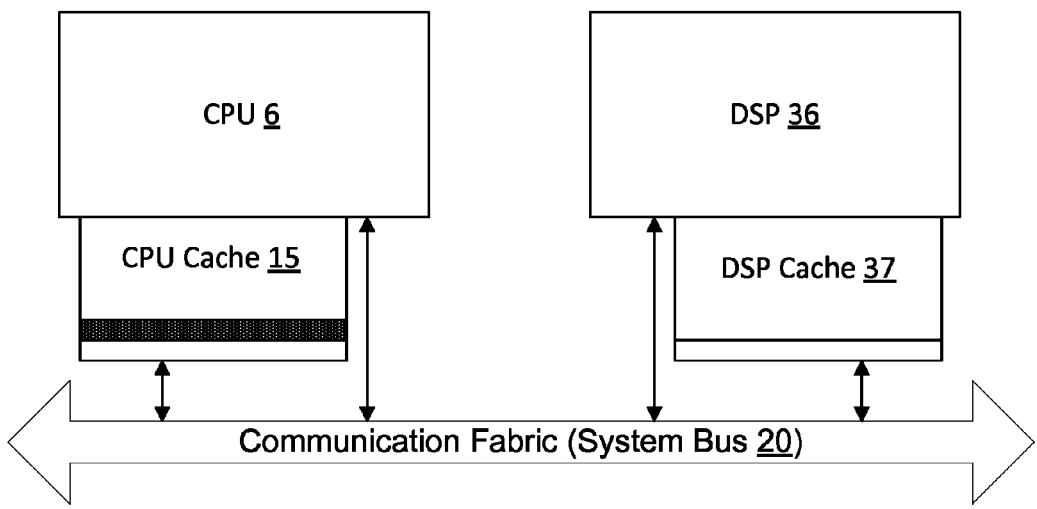
FIG. 7 shows another example of a heterogeneous multicore system according to another example of the disclosure.

FIG. 7 shows another example of a heterogeneous multicore system according to another example of the disclosure. In this example, the first processor is CPU 6 and the second processor is a DSP 36. Again, CPU 6 and DSP 36 may be configured to transfer data between their associated caches (e.g., CPU cache 15 and DSP cache 37) according to the techniques depicted in FIGS. 2-5. Also, data may be transferred from the second processor (e.g., DSP 36) to the first processor (e.g., CPU 6) in the same manner.

Figure 8:
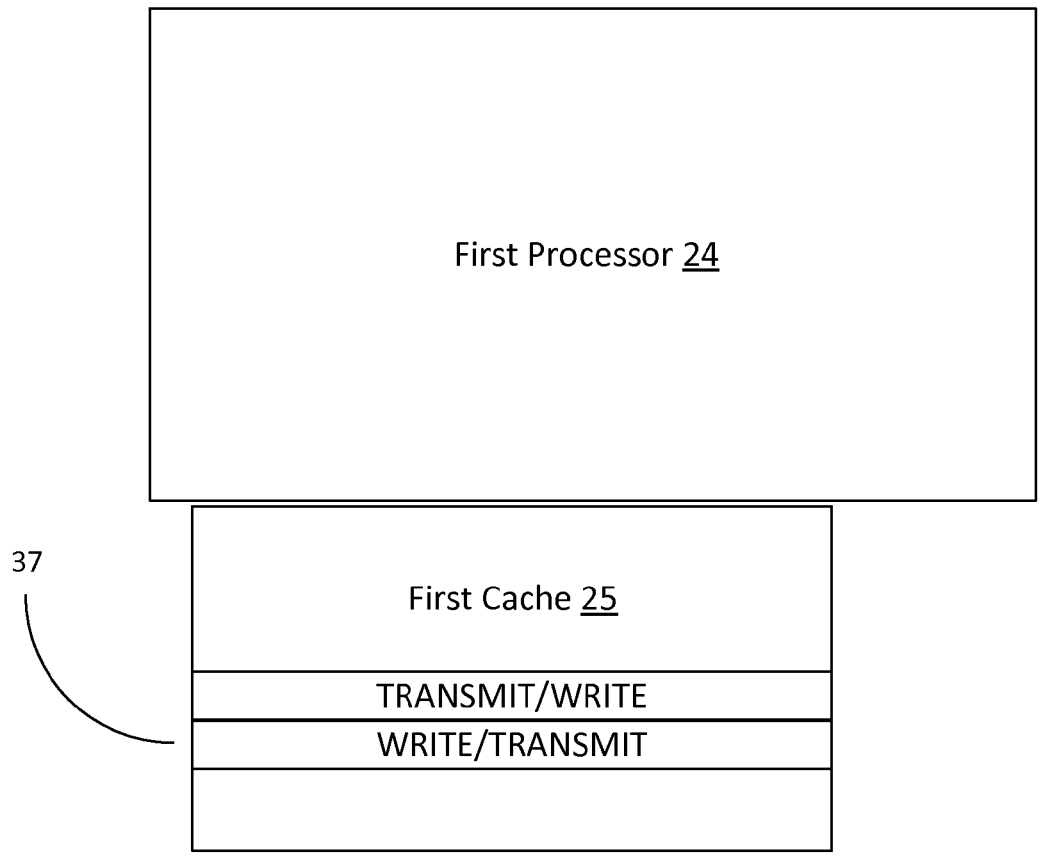
FIG. 8 is a block diagram illustrating ping-pong buffering according to one example of the disclosure.

FIG. 8 is a block diagram illustrating ping-pong buffering according to one example of the disclosure. In this example, two or more partitions 37 of first cache 25 may be configured to enable ping-pong buffering, sometimes referred to as double-buffering. In ping-pong buffering, one partition is configured to receive data written from a processor (e.g., first processor 24), while another partition is configured to transmit and/or transfer data to another memory (e.g., second cache 27) and/or hardware (e.g., a display). Once data is written and/or transmitted from the respective partitions, the designation of each partition may be switched. That is, the partition that was previously written into by first processor 24 may be re-designated to be a transmit partition, and the previously written data may then be transferred to another memory (e.g., second cache 27). Likewise, the partition that was previously transmitted from may be cleared and re-designated as a partition that may now be written into. This structure facilitates parallel data writes and transfers. Though not shown, memory controllers and/or bus drivers may be used to effect transmission of data from the transmit partition.

Figure 9:
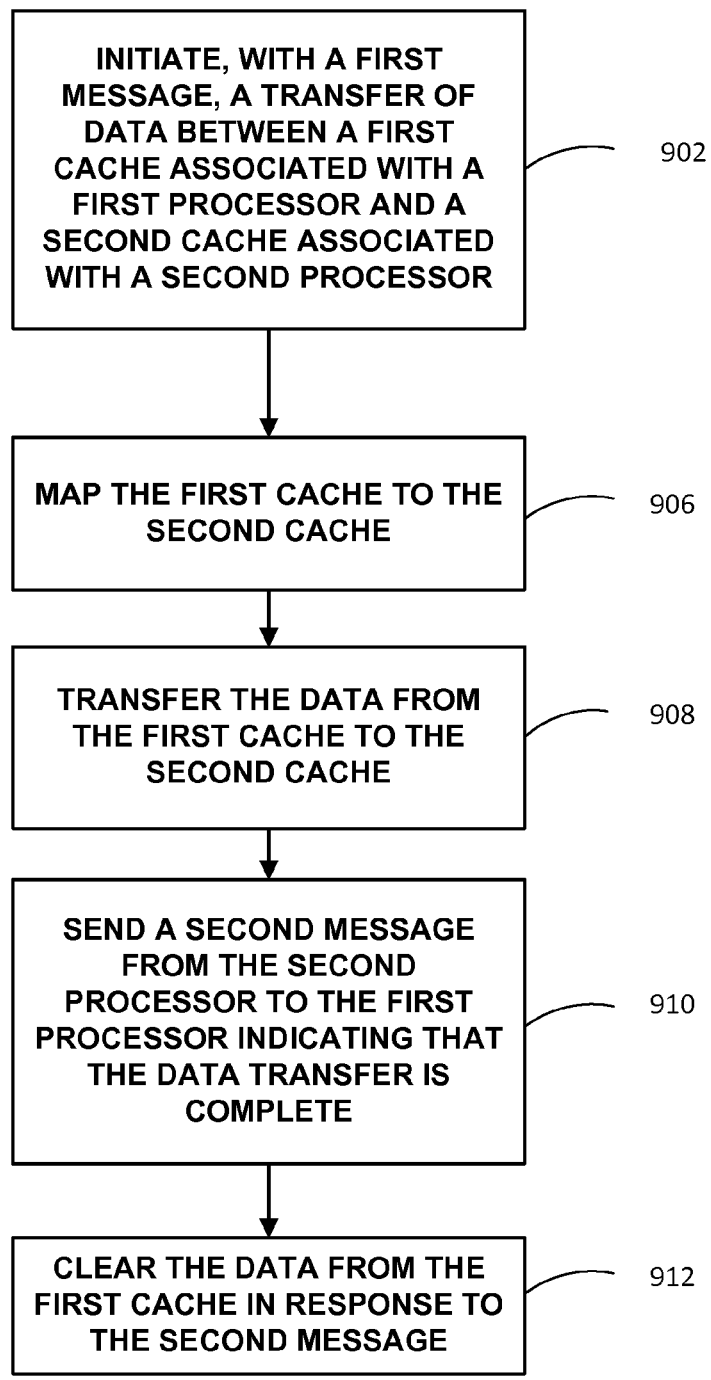
FIG. 9 is a flowchart illustrating an example method according to the disclosure.

FIG. 9 is a flowchart illustrating an example method according to the disclosure. The techniques showed in FIG. 9 may be performed by a computing device. For example, the techniques of FIG. 9 may be performed by computing device 2 of FIG. 1. Computing device 2 may be configured to perform a method of transferring data between two caches. The method includes initiating, with a first message, a transfer of data between a first cache associated with a first processor and a second a second cache associated with a second processor (902). In one example, initiating the transfer may include sending a first message from the first processor to the second processor indicating that data is available for transfer from a first cache associated with the first processor and then requesting, from the second processor, a data transfer of the data from the first cache to a second cache associated with the second processor. In another example, the transfer is initiated by only sending a first message from the second processor to the first processor requesting the data.

In some examples, partitions in the first cache and the second cache may be pre-mapped to each other. In some examples, this mapping will consist of designating a partition of the first cache as tightly-coupled memory for the second processor. In other examples, the computing device may be configured to map the first cache to the second cache before transferring the data (906). Next, computing device 2 may transfer the data from the first cache to the second cache in response to the request (908). Computing device 2 may then send a second message from the second processor to the first processor indicating that the data transfer is complete (910). In some examples, computing device 2 may be further configured to clear the data from the first cache in response to the second message (912). In this context, clearing the data from the first cache may involve marking the memory addresses storing the data as available to be overwritten.

In some example of the disclosure the first processor and the second processor are of different types. For example, the first processor and the second processor form a heterogeneous multicore system. The heterogeneous multicore system may be part of a mobile device, such as a smartphone or tablet computer.

In some examples, the first processor is a central processing unit (CPU) and the second processor is a graphics processing unit (GPU). In other examples, the first processor is a graphics processing unit (GPU) and the second processor is a central processing unit (CPU). In still other examples, the first processor is a central processing unit (CPU) and the second processor is a digital signal processor (DSP).

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transferring data between two caches comprising:
    initiating, with a first message sent between a first processor and a second processor, a transfer of data between a first cache associated with the first processor and a second cache associated with the second processor, wherein the first processor and the second processor are of different types;
    transferring the data directly from the first cache to the second cache in response to the first message; and
    sending a second message from the second processor to the first processor indicating that the data transfer is complete.

2. The method of claim 1, wherein initiating the transfer comprises:
    sending the first message from the first processor to the second processor indicating that data is available for transfer from the first cache; and
    requesting, from the second processor, a data transfer of the data from the first cache to the second cache.

3. The method of claim 2, further comprising:
    mapping the first cache to the second cache before transferring the data.

4. The method of claim 2, further comprising:
    clearing the data from the first cache in response to the second message.

5. The method of claim 1, wherein at least one partition of the first cache is configured to be a tightly coupled memory for the second cache.

6. The method of claim 1, wherein the first processor and the second processor form a heterogeneous multicore system.

7. The method of claim 6, wherein the first processor is a central processing unit (CPU) and wherein the second processor is a graphics processing unit (GPU).

8. The method of claim 6, wherein the first processor is a graphics processing unit (GPU) and wherein the second processor is a central processing unit (CPU).

9. The method of claim 6, wherein the first processor is a central processing unit (CPU) and the second processor is a digital signal processor (DSP).

10. The method of claim 6, wherein the heterogeneous multicore system is in a mobile device.

11. An apparatus configured to transfer data between two caches comprising:
    means for initiating, with a first message sent between a first processor and a second processor, a transfer of data between a first cache associated with the first processor and a second cache associated with the second processor, wherein the first processor and the second processor are of different types;
    means for transferring the data directly from the first cache to the second cache in response to the first message; and
    means for sending a second message from the second processor to the first processor indicating that the data transfer is complete.

12. The apparatus of claim 11, wherein the means for initiating the transfer comprises:
    means for sending the first message from the first processor to the second processor indicating that data is available for transfer from the first cache; and
    means for requesting, from the second processor, a data transfer of the data from the first cache to the second cache.

13. The apparatus of claim 12, further comprising:
    means for mapping the first cache to the second cache before transferring the data.

14. The apparatus of claim 12, further comprising:
    means for clearing the data from the first cache in response to the second message.

15. The apparatus of claim 12, wherein at least one partition of the first cache is configured to be a tightly coupled memory for the second cache.

16. A non-transitory computer-readable storage medium storing instructions that, when executed, cause one or more processors of a device configured to transfer data between two caches to:
    initiate, with a first message sent between a first processor and a second processor, a transfer of data between a first cache associated with the first processor and a second cache associated with the second processor, wherein the first processor and the second processor are of different types;
    transfer the data directly from the first cache to the second cache in response to the first message; and
    send a second message from the second processor to the first processor indicating that the data transfer is complete.

17. The computer-readable storage medium of claim 16, wherein the instructions for causing the one more processors to initiate the transfer include instructions for causing the one or more processor to:
    send the first message from the first processor to the second processor indicating that data is available for transfer from the first cache; and
    request, from the second processor, a data transfer of the data from the first cache to the second cache.

18. The computer-readable storage medium of claim 17, wherein the instructions further cause the one more processors to:
    map the first cache to the second cache before transferring the data.

19. The computer-readable storage medium of claim 17, wherein the instructions further cause the one more processors to:
    clear the data from the first cache in response to the second message.

20. The computer-readable storage medium of claim 16, wherein at least one partition of the first cache is configured to be a tightly coupled memory for the second cache.

21. An apparatus configured to transfer data between two caches, the apparatus comprising:
    a first cache configured to store data; and
    a first processor in communication with the first cache, the first processor configured to:
        initiate, with a first message sent between the first processor and a second processor, a transfer of the data between the first cache associated with the first processor and a second cache associated with the second processor, wherein the first processor and the second processor are of different types;
        transfer the data directly from the first cache to the second cache in response to the first message; and
        receive a second message from the second processor indicating that the data transfer is complete.

22. The apparatus of claim 21, wherein to initiate the transfer, the first processor is further configured to:
    send the first message from the first processor to the second processor indicating that data is available for transfer from the first cache; and
    request, from the second processor, a data transfer of the data from the first cache to the second cache.

23. The apparatus of claim 22, wherein the first processor is further configured to:
    map the first cache to the second cache before transferring the data.

24. The apparatus of claim 22, wherein the first processor is further configured to:
    clear the data from the first cache in response to the second message.

25. The apparatus of claim 21, wherein at least one partition of the first cache is configured to be a tightly coupled memory for the second cache.

26. The apparatus of claim 21, wherein the first processor and the second processor form a heterogeneous multicore system.

27. The apparatus of claim 26, wherein the first processor is a central processing unit (CPU) and wherein the second processor is a graphics processing unit (GPU).

28. The apparatus of claim 26, wherein the first processor is a graphics processing unit (GPU) and wherein the second processor is a central processing unit (CPU).

29. The apparatus of claim 26, wherein the first processor is a central processing unit (CPU) and the second processor is a digital signal processor (DSP).

30. The apparatus of claim 26, wherein the heterogeneous multicore system is in a mobile device.

* * * * *